US010507859B2

(12) United States Patent
Bacallao

(10) Patent No.: US 10,507,859 B2
(45) Date of Patent: Dec. 17, 2019

(54) SHOPPING CART BAGGING STATION

(71) Applicant: Walmart Apollo, LLC, Bentonville, AR (US)

(72) Inventor: Yurgis Mauro Bacallao, Centerton, AR (US)

(73) Assignee: WALMART APOLLO, LLC, Bentonville, AR (US)

(*) Notice: Subject to any disclaimer, the term of this patent is extended or adjusted under 35 U.S.C. 154(b) by 0 days.

(21) Appl. No.: 16/239,064

(22) Filed: Jan. 3, 2019

(65) Prior Publication Data

US 2019/0248398 A1    Aug. 15, 2019

Related U.S. Application Data

(60) Provisional application No. 62/628,684, filed on Feb. 9, 2018.

(51) Int. Cl.
  *B62B 3/00* (2006.01)
  *B62B 3/14* (2006.01)
  *B65B 67/12* (2006.01)

(52) U.S. Cl.
  CPC ............ *B62B 3/1472* (2013.01); *B62B 3/002* (2013.01); *B65B 67/1227* (2013.01)

(58) Field of Classification Search
  CPC ..... B62B 3/1472; B62B 3/002; B62B 3/1464; B62B 5/00; B65B 67/1227; B65B 2067/1294; B65B 67/1266; B65B 67/1233; B65B 43/14; B65B 67/1205;
  (Continued)

(56) References Cited

U.S. PATENT DOCUMENTS

| 259,932 A | 6/1882 | Sims |
| 370,563 A | 9/1887 | Simmons |
| 477,235 A | 6/1892 | Timmerman |

(Continued)

FOREIGN PATENT DOCUMENTS

| AU | 1142402 A1 | 4/2002 |
| AU | 2002364902 A1 | 5/2004 |

(Continued)

OTHER PUBLICATIONS

Search Report in GB Patent Application No. GB1713267.1, dated Dec. 22, 2017; 5 pages.

(Continued)

*Primary Examiner* — S. Joseph Morano
*Assistant Examiner* — Hilary L Johns
(74) *Attorney, Agent, or Firm* — Schmeiser, Olsen & Watts LLP; Karen E. Jachimowicz

(57) ABSTRACT

Described is a shopping cart bagging station that is used in retail stores to dispense shopping bags while a customer of the retail store shops. The shopping cart bagging station holds and dispenses shopping bags. The shopping cart bagging station is coupled to a shopping cart so that the customer can load items they purchase into the shopping bags as they shop. The shopping cart bagging station includes a support channel and three hooks coupled to the support channel. The support channel couples to the shopping cart. The three hooks hold shopping bags. By using the shopping cart bagging station, a customer does not have to visit a checkout station to bag their purchased items.

19 Claims, 8 Drawing Sheets

(58) Field of Classification Search
CPC ..... B65B 67/1238; B65B 67/12; A47F 9/042; A47F 13/085; B60R 7/00
USPC .................. 280/33.992; 248/95; 224/411
See application file for complete search history.

(56) References Cited

U.S. PATENT DOCUMENTS

| | | | |
|---|---|---|---|
| 562,229 A | 6/1896 | Lenney | |
| 635,100 A | 10/1899 | Huebel | |
| 765,388 A | 7/1904 | Lanpher | |
| 797,871 A | 8/1905 | Smith | |
| 809,568 A | 1/1906 | Hulburt | |
| 873,188 A | 12/1907 | Thumann | |
| 890,693 A | 6/1908 | McCoy | |
| 893,930 A | 7/1908 | Lederman | |
| 896,443 A | 8/1908 | Dyett | |
| 936,736 A | 10/1909 | Porter et al. | |
| 995,798 A | 6/1911 | McCullough | |
| 1,055,745 A | 3/1913 | Harrison | |
| 1,069,108 A | 8/1913 | Buhl | |
| 1,252,740 A | 1/1918 | Thornblade | |
| 1,281,656 A * | 10/1918 | Raschick | A45F 5/02 24/3.12 |
| 1,284,579 A | 11/1918 | Brown | |
| 1,653,393 A | 12/1927 | Cox | |
| 1,662,140 A | 3/1928 | Whitesides | |
| 2,240,629 A | 5/1941 | Smith | |
| 2,305,863 A | 12/1942 | Ginter | |
| 2,498,446 A | 2/1950 | Pawsat | |
| 2,563,679 A | 8/1951 | Hardy | |
| 2,603,438 A | 7/1952 | Adams | |
| 2,682,956 A | 7/1954 | Pike | |
| 2,797,058 A | 6/1957 | Packham | |
| 2,998,955 A | 9/1961 | Hertzog | |
| 3,133,660 A | 5/1964 | Roberts | |
| 3,266,742 A | 8/1966 | Pena | |
| 3,313,504 A | 4/1967 | Thorkild | |
| 3,339,745 A | 9/1967 | Sugerman | |
| D209,279 S | 11/1967 | Cohen | |
| 3,438,644 A | 4/1969 | Kaplan et al. | |
| 3,475,067 A | 10/1969 | Girard | |
| 3,747,298 A | 7/1973 | Lieberman | |
| 3,930,696 A | 1/1976 | Hight et al. | |
| 3,943,859 A | 3/1976 | Boone | |
| 3,995,803 A | 12/1976 | Uitz | |
| 4,048,754 A | 9/1977 | Laux | |
| 4,082,939 A | 4/1978 | Walters | |
| 4,106,617 A | 8/1978 | Boone | |
| 4,269,336 A | 5/1981 | Humlong | |
| 4,305,558 A | 12/1981 | Baker | |
| 4,354,643 A | 10/1982 | Kenner | |
| 4,367,819 A | 1/1983 | Lewis | |
| 4,376,502 A | 3/1983 | Cohen | |
| 4,403,807 A | 9/1983 | Wilkinson et al. | |
| 4,456,125 A | 6/1984 | Chap | |
| 4,480,810 A | 11/1984 | Hall | |
| 4,576,388 A | 3/1986 | Pope | |
| 4,583,753 A | 4/1986 | Economy | |
| 4,595,153 A | 6/1986 | Goetz | |
| 4,655,409 A | 4/1987 | Zima | |
| 4,682,782 A | 7/1987 | Mills | |
| 4,702,402 A | 10/1987 | Ferri | |
| 4,728,070 A | 3/1988 | Engelbrecht | |
| 4,838,504 A | 6/1989 | Bittenbinder | |
| D302,062 S | 7/1989 | Sable | |
| 4,881,577 A | 11/1989 | Stroh et al. | |
| 4,881,706 A | 11/1989 | Sedlik | |
| 4,968,047 A | 11/1990 | Ferris | |
| 4,974,799 A | 12/1990 | Palmer | |
| 4,997,149 A | 3/1991 | Koch | |
| 4,998,647 A | 3/1991 | Sharp | |
| 4,998,694 A * | 3/1991 | Barteaux | B65B 67/1216 248/100 |
| 5,002,215 A | 3/1991 | Gregoire | |
| 5,005,791 A | 4/1991 | Lanzen | |
| 5,190,253 A | 3/1993 | Sable | |
| 5,362,077 A | 11/1994 | Adamson | |
| 5,366,123 A | 11/1994 | Range | |
| 5,385,318 A | 1/1995 | Rizzuto | |
| 5,390,443 A | 2/1995 | Emalfarb et al. | |
| 5,427,288 A | 6/1995 | Trubee | |
| 5,437,346 A | 8/1995 | Dumont | |
| 5,439,120 A | 8/1995 | Brozak | |
| 5,443,173 A | 8/1995 | Emery et al. | |
| D363,208 S | 10/1995 | Seidel | |
| 5,460,279 A | 10/1995 | Emery et al. | |
| 5,465,846 A | 11/1995 | Blyth et al. | |
| 5,503,297 A | 4/1996 | Frankel | |
| 5,513,823 A | 5/1996 | Bresnahan | |
| 5,531,366 A | 7/1996 | Strom | |
| 5,533,361 A | 7/1996 | Halpem | |
| 5,564,566 A | 10/1996 | Lamb | |
| 5,618,008 A | 4/1997 | Dearwester et al. | |
| 5,704,497 A | 1/1998 | Wyatt | |
| 5,727,721 A | 3/1998 | Guido et al. | |
| D396,372 S | 7/1998 | Goodman | |
| 5,836,486 A | 11/1998 | Ohsugi | |
| 5,875,902 A | 3/1999 | Emery et al. | |
| 5,915,584 A * | 6/1999 | Sposit | B65B 67/1227 220/495.09 |
| D412,080 S | 7/1999 | Emery et al. | |
| 6,018,397 A | 1/2000 | Cloutier et al. | |
| 6,041,945 A | 3/2000 | Faraj | |
| 6,086,023 A | 7/2000 | Kerr et al. | |
| 6,109,462 A | 8/2000 | Emalfarb et al. | |
| 6,152,408 A | 11/2000 | O'Grady | |
| 6,155,521 A | 12/2000 | O'Hanlon | |
| 6,170,679 B1 | 1/2001 | Frye | |
| 6,193,265 B1 | 2/2001 | Yemini | |
| 6,264,035 B1 * | 7/2001 | Petrie | A47F 9/042 206/554 |
| 6,299,001 B1 | 10/2001 | Frolov et al. | |
| 6,305,572 B1 | 10/2001 | Daniels et al. | |
| D452,944 S | 1/2002 | Schmidt | |
| 6,341,704 B1 | 1/2002 | Michel, Jr. | |
| 6,364,266 B1 | 4/2002 | Garvin | |
| 6,374,577 B1 * | 4/2002 | Ventura | A45F 5/02 206/554 |
| 6,390,422 B2 | 5/2002 | Banko | |
| 6,409,031 B1 | 6/2002 | Wynne | |
| D459,979 S | 7/2002 | Goodman | |
| 6,481,583 B1 | 11/2002 | Black et al. | |
| 6,543,638 B2 | 4/2003 | Wile | |
| 6,561,403 B1 | 5/2003 | Kannankeril et al. | |
| 6,601,759 B2 | 8/2003 | Fife et al. | |
| 6,606,411 B1 | 8/2003 | Loui et al. | |
| 6,607,229 B1 | 8/2003 | McIntosh | |
| 6,648,265 B2 | 11/2003 | Goldberg | |
| 6,655,537 B1 | 12/2003 | Lang et al. | |
| 6,685,075 B1 | 2/2004 | Kannankeril | |
| 6,726,145 B1 | 4/2004 | Kraus | |
| 6,726,156 B1 * | 4/2004 | Scola | B65B 67/1227 248/100 |
| D490,691 S | 6/2004 | Buss et al. | |
| 6,745,186 B1 | 6/2004 | Testa et al. | |
| 6,789,687 B2 | 9/2004 | Cramer | |
| 6,805,271 B2 | 10/2004 | Holden | |
| 6,810,149 B1 | 10/2004 | Squilla et al. | |
| 6,832,739 B1 | 12/2004 | Kraus | |
| 6,886,101 B2 | 4/2005 | Glazer et al. | |
| 6,937,989 B2 | 8/2005 | Mcintyre et al. | |
| 7,066,389 B2 | 6/2006 | Dickover et al. | |
| 7,077,612 B1 | 7/2006 | Giggle, III et al. | |
| 7,128,251 B1 | 10/2006 | Galle | |
| 7,172,092 B2 | 2/2007 | Yang et al. | |
| 7,177,820 B2 | 2/2007 | Mcintyre et al. | |
| 7,182,210 B2 | 2/2007 | Metcalf | |
| 7,192,035 B1 * | 3/2007 | Lioce | B62B 3/1472 280/33.991 |
| D540,591 S | 4/2007 | Snell | |
| 7,222,363 B2 | 5/2007 | Rice et al. | |
| D552,901 S | 10/2007 | Wilfong, Jr. et al. | |
| D571,518 S | 6/2008 | Waldman | |
| D575,973 S | 9/2008 | Goodman et al. | |

(56) References Cited

U.S. PATENT DOCUMENTS

| | | | |
|---|---|---|---|
| 7,431,208 B2 | 10/2008 | Feldman et al. | |
| 7,475,885 B2 | 1/2009 | Kovath | |
| 7,530,537 B2 | 5/2009 | Kandah | |
| 7,587,756 B2 | 9/2009 | Peart et al. | |
| 7,610,717 B2 | 11/2009 | Luken et al. | |
| 7,654,409 B2 | 2/2010 | Hoffman | |
| 7,716,064 B2 | 5/2010 | Mcintyre et al. | |
| D616,680 S | 6/2010 | Snider | |
| 7,789,248 B1* | 9/2010 | Salerno | A47G 25/08 211/85.7 |
| 7,850,014 B2 | 12/2010 | Nguyen et al. | |
| 7,887,068 B2 | 2/2011 | Ferguson | |
| 8,002,127 B2 | 8/2011 | Ward et al. | |
| 8,069,092 B2 | 11/2011 | Bryant | |
| D650,209 S | 12/2011 | Snider | |
| D654,737 S | 2/2012 | Guindi | |
| 8,177,079 B2 | 5/2012 | Schwartzkopf et al. | |
| D666,858 S | 9/2012 | Goodman | |
| D667,250 S | 9/2012 | Goodman et al. | |
| 8,292,094 B2 | 10/2012 | Morton | |
| 8,336,800 B1 | 12/2012 | Lopez | |
| 8,403,343 B1* | 3/2013 | Seawel | B62B 5/0495 280/33.992 |
| D689,282 S | 9/2013 | Lindeman | |
| 8,572,712 B2 | 10/2013 | Rice et al. | |
| D693,577 S | 11/2013 | Goodman et al. | |
| 8,640,890 B2 | 2/2014 | Schiller | |
| 8,668,207 B1 | 3/2014 | Gilliam | |
| 8,746,640 B2 | 6/2014 | Broadley et al. | |
| 8,814,039 B2 | 8/2014 | Bishop et al. | |
| D713,663 S | 9/2014 | Pryor | |
| 8,820,633 B2 | 9/2014 | Bishop et al. | |
| 8,851,369 B2 | 10/2014 | Bishop et al. | |
| D718,054 S | 11/2014 | Goodman et al. | |
| D719,372 S | 12/2014 | Goodman et al. | |
| 8,905,411 B1 | 12/2014 | Blanton | |
| D720,538 S | 1/2015 | Goodman et al. | |
| D728,255 S | 5/2015 | Guindi et al. | |
| 9,199,656 B1 | 12/2015 | Tong et al. | |
| D746,592 S | 1/2016 | Goodman et al. | |
| D747,876 S | 1/2016 | Goodman et al. | |
| D750,472 S | 3/2016 | Kuka | |
| D751,763 S | 3/2016 | Goodman et al. | |
| D784,721 S | 4/2017 | Goodman et al. | |
| 9,623,995 B2 | 4/2017 | Tan | |
| D785,333 S | 5/2017 | Goodman et al. | |
| D785,369 S | 5/2017 | Goodman et al. | |
| D787,303 S | 5/2017 | Garvin | |
| 9,656,827 B2 | 5/2017 | Sudhir | |
| 9,694,840 B2 | 7/2017 | Hendrick et al. | |
| 9,737,141 B2 | 8/2017 | Johnson | |
| D796,771 S | 9/2017 | Bacallao et al. | |
| D803,032 S | 11/2017 | Jammehdiabadi | |
| 9,844,283 B2 | 12/2017 | Bacallao | |
| 10,173,708 B1* | 1/2019 | Bacallao | B62B 3/1464 |
| 10,179,599 B1* | 1/2019 | Lambrecht | B62B 3/1468 |
| 2001/0022333 A1* | 9/2001 | Banko | B62B 9/26 248/100 |
| 2002/0060276 A1* | 5/2002 | Rosier | B65D 33/14 248/95 |
| 2002/0145086 A1* | 10/2002 | Alvarado | A47F 13/085 248/95 |
| 2002/0170937 A1 | 11/2002 | Yeh et al. | |
| 2002/0185510 A1 | 12/2002 | Holsclaw | |
| 2002/0185513 A1 | 12/2002 | Morris | |
| 2003/0000905 A1 | 1/2003 | Zidek | |
| 2003/0042694 A1 | 3/2003 | Werner | |
| 2003/0052464 A1* | 3/2003 | McGuire | B62B 3/1472 280/33.992 |
| 2003/0098326 A1 | 5/2003 | Wile | |
| 2003/0121871 A1 | 7/2003 | Zadro | |
| 2003/0198390 A1 | 10/2003 | Loui et al. | |
| 2004/0000529 A1 | 1/2004 | Gladnick et al. | |
| 2004/0000612 A1 | 1/2004 | Young | |
| 2004/0026439 A1* | 2/2004 | Bolton | A47F 9/042 221/26 |
| 2004/0075015 A1 | 4/2004 | Cain et al. | |
| 2004/0104316 A1* | 6/2004 | Turvey | A47F 13/085 248/95 |
| 2004/0124598 A1 | 7/2004 | Williams | |
| 2004/0139398 A1 | 7/2004 | Testa et al. | |
| 2004/0178298 A1 | 9/2004 | Kennard | |
| 2004/0262385 A1 | 12/2004 | Blaeuer | |
| 2005/0040615 A1* | 2/2005 | Frommherz | B62B 3/1468 280/33.992 |
| 2005/0056718 A1 | 3/2005 | Kamenstein | |
| 2005/0205578 A1 | 9/2005 | Yeh | |
| 2005/0274859 A1* | 12/2005 | Malik | B65B 67/1233 248/302 |
| 2005/0284729 A1 | 12/2005 | LoRusso | |
| 2006/0049591 A1 | 3/2006 | Pennell | |
| 2006/0097467 A1 | 5/2006 | Solomon et al. | |
| 2006/0124799 A1 | 6/2006 | Johnson | |
| 2006/0226187 A1 | 10/2006 | Linker | |
| 2007/0095769 A1 | 5/2007 | Jenkins | |
| 2007/0144988 A1* | 6/2007 | Alvarado | A47F 13/085 211/85.15 |
| 2007/0176058 A1 | 8/2007 | Kohn | |
| 2007/0186515 A1 | 8/2007 | Ruetten et al. | |
| 2007/0204044 A1 | 8/2007 | Rice et al. | |
| 2007/0261159 A1 | 11/2007 | Marks | |
| 2007/0278359 A1 | 12/2007 | Kandah | |
| 2008/0000910 A1 | 1/2008 | Gaillard | |
| 2008/0001019 A1 | 1/2008 | Brown | |
| 2008/0169253 A1 | 7/2008 | Vitale | |
| 2008/0202851 A1 | 8/2008 | Schwenke et al. | |
| 2008/0215448 A1 | 9/2008 | Boyle et al. | |
| 2008/0215449 A1 | 9/2008 | Boyle et al. | |
| 2008/0217342 A1 | 9/2008 | Cinque | |
| 2008/0245684 A1 | 10/2008 | Yeatman | |
| 2009/0078731 A1 | 3/2009 | Yi | |
| 2009/0078815 A1 | 3/2009 | Tong et al. | |
| 2009/0092342 A1 | 4/2009 | Rolim de Oliveira | |
| 2009/0184162 A1 | 7/2009 | Rice et al. | |
| 2009/0261050 A1 | 10/2009 | Curren | |
| 2009/0319352 A1 | 12/2009 | Boyle et al. | |
| 2009/0327087 A1 | 12/2009 | Beck et al. | |
| 2010/0096514 A1 | 4/2010 | Adair et al. | |
| 2010/0102014 A1 | 4/2010 | Yang | |
| 2010/0123050 A1 | 5/2010 | Astwood | |
| 2010/0148019 A1 | 6/2010 | Simhaee | |
| 2010/0206825 A1 | 8/2010 | Johnston et al. | |
| 2010/0218370 A1* | 9/2010 | Lin | B65B 67/1233 29/700 |
| 2010/0219219 A1 | 9/2010 | Svetina | |
| 2010/0264101 A1 | 10/2010 | Ma | |
| 2010/0289234 A1* | 11/2010 | Sonnendorfer | G09F 3/16 280/33.992 |
| 2011/0266092 A1 | 11/2011 | Marquis et al. | |
| 2012/0125970 A1 | 5/2012 | Tsui | |
| 2012/0167182 A1 | 6/2012 | Rice et al. | |
| 2012/0169020 A1 | 7/2012 | Farrell | |
| 2012/0305618 A1 | 12/2012 | Tan | |
| 2012/0305619 A1 | 12/2012 | Tan | |
| 2013/0026120 A1 | 1/2013 | Johnson | |
| 2013/0037665 A1 | 2/2013 | Brasell et al. | |
| 2013/0048689 A1 | 2/2013 | Ling | |
| 2013/0092804 A1 | 4/2013 | Laitila et al. | |
| 2013/0134181 A1 | 5/2013 | Helseth et al. | |
| 2013/0264242 A1 | 10/2013 | Wojno | |
| 2013/0330163 A1 | 12/2013 | Marsh | |
| 2014/0048576 A1 | 2/2014 | Tan | |
| 2014/0131506 A1 | 5/2014 | Clarkin | |
| 2014/0144966 A1 | 5/2014 | Tan | |
| 2014/0209651 A1 | 7/2014 | Wilfong | |
| 2014/0367507 A1 | 12/2014 | Trampolski | |
| 2016/0016752 A1 | 1/2016 | Helseth et al. | |
| 2016/0096542 A1 | 4/2016 | Fukushima | |
| 2016/0107668 A1 | 4/2016 | Robins | |
| 2016/0183744 A1 | 6/2016 | Sadikov et al. | |
| 2016/0227969 A1 | 8/2016 | Morris | |
| 2016/0242605 A1 | 8/2016 | Heymann et al. | |
| 2016/0270607 A1 | 9/2016 | Zeng | |

(56) References Cited

U.S. PATENT DOCUMENTS

| | | | |
|---|---|---|---|
| 2016/0300235 | A1 | 10/2016 | Boyle et al. |
| 2016/0311454 | A1* | 10/2016 | Hendrick ............... B62B 3/1464 |
| 2016/0367088 | A1 | 12/2016 | Allard et al. |
| 2017/0066550 | A1 | 3/2017 | Tsai |
| 2017/0172322 | A1* | 6/2017 | Bacallao ................. A47F 9/042 |
| 2017/0174242 | A1* | 6/2017 | Bacallao ................. B62B 3/106 |
| 2017/0174243 | A1* | 6/2017 | Bacallao ................. B62B 3/106 |
| 2017/0197650 | A1 | 7/2017 | Whistler |
| 2017/0259959 | A1 | 9/2017 | Nilsson et al. |
| 2017/0267412 | A1 | 9/2017 | Krause |
| 2017/0275126 | A1 | 9/2017 | Sudhir |
| 2017/0325603 | A1* | 11/2017 | Bacallao ................. A47F 9/042 |
| 2017/0349200 | A1* | 12/2017 | Winton ..................... B62B 3/00 |
| 2018/0009460 | A1* | 1/2018 | Bacallao ............... B62B 3/1464 |
| 2018/0027994 | A1* | 2/2018 | Bacallao ................. A47F 9/042 |
| 2018/0049564 | A1* | 2/2018 | Bacallao ................. B62B 3/146 |
| 2018/0093690 | A1* | 4/2018 | Bacallao ................. B62B 3/146 |

FOREIGN PATENT DOCUMENTS

| | | |
|---|---|---|
| AU | 2003272329 | 6/2004 |
| CA | 2789288 A1 | 3/2014 |
| CA | 2958358 A1 | 8/2017 |
| DE | 29806330 U | 7/1998 |
| EP | 1182859 A2 | 2/2002 |
| EP | 1510944 A1 | 3/2005 |
| EP | 2387772 A1 | 11/2011 |
| EP | 2438562 A1 | 4/2012 |
| GB | 2547525 A1 | 8/2017 |
| JP | 2000112997 | 4/2000 |
| JP | 2007323453 A | 12/2007 |
| JP | 2008282412 A | 11/2008 |
| WO | 2002029702 | 4/2002 |
| WO | 2004042614 | 5/2004 |
| WO | 2004038997 | 6/2004 |
| WO | 2005094407 | 10/2005 |
| WO | 2006012538 | 2/2006 |
| WO | 2007141417 A1 | 12/2007 |
| WO | 2010083113 | 7/2010 |
| WO | 2011008625 | 1/2011 |
| WO | 2013079878 A1 | 6/2013 |

OTHER PUBLICATIONS

Non-Final Office Action in U.S. Appl. No. 15/653,768, dated Jan. 10, 2018; 31 pages.

Non-Final Office Action in U.S. Appl. No. 15/641,367, dated Jan. 12, 2018; 9 pages.

Non-Final Office Action in U.S. Appl. No. 15/703,307, dated Jan. 18, 2018; 9 pages.

Search Report in GB Patent Application No. GB1713283.8, dated Dec. 22, 2017; 4 pages.

"Universal Double Car Vehicle Hangers/Hooks Grocery Bags/Handbags/Umbrellas Organizer—Black," DealsMachine.com, accessed on Oct. 15, 2015; 2 pages.

"Over-the-Door Hook 3 Hook InterDesign," Target.com, accessed on Oct. 15, 2015; 4 pages.

JoshM "Smart Shopping Cart: Bagging Station Design," EECS398SmartShoppingCart.blogspot.in, Mar. 22, 2015; 2 pages.

"Clear Suspended Ceiling Hook," DoItBest.com, accessed on Oct. 14, 2015; 3 pages.

"Industrial T-shirt Bag Stand—Just like Grocery Stores," SmallBizWarehouse.com, accessed on Oct. 14, 2015; 4 pages.

"Dual L-Shape Flash Bracket Holder Mount for Canon Nikon Speedlikte DSLR Camera," Amazon.com, accessed on Jan. 5, 2016; 5 pages.

"InterDesign Classico Over-the-Door Tie and Belt Rack," HoldnStorage.com, accessed on Nov. 22, 2016; 2 pages.

"Small Matte 'So-Hooked' Rack," The Container Store, accessed on Nov. 22, 2016; 2 pages.

"POS Check Out Plastic Bag Holder Dispenser for Retail Supermarket Brand New!" Ebay.com, accessed on Nov. 17, 2016; 5 pages.

"Lot 2 Royston Plastic Grocery Bag Holder Dispenser Stand Point of Sale Shopping," TeraPeak.com, accessed on Nov. 17, 2016; 3 pages.

"Bag Holders," ULINE.mx, accessed on Nov. 17, 2016; 1 page.

"OEM Express Checkout Counter / Customized Supermarket Cash Register Stands Counters," Guangzhou ECO Commerical Equipment Co., Ltd, SupermarketCheckoutCounters.com, accessed on Nov. 17, 2016; 3 pages.

"Retrospec Bicycles Detachable Steel Half-Mesh Apollo Bike Basket with Handles," Retrospec Bicycles, Amazon.com, accessed on Apr. 27, 2017; 1 page.

"Transport trolley / waste / with waste bag holder / 1-bag WASTY 70 LT Francehopital," MedicalExpo.com, accessed on Apr. 25, 2017; 25 pages.

Jackie, "How to Make a Clothespin Bag," TheHappyHousewife.com, Apr. 19, 2012; 14 pages.

"Gluman Combo of 12 Sparkle Clothes Hangers (Yellow) and 6 Plastic Kitchen Storage Containers Blue (125 ml)," PAYtm.com, accessed on Apr. 24, 2017; 3 pages.

"Pack-N-Tote Reusable Grocery Cart Bag, Hooks Directly to the Shopping Cart, Black," Six Mour Creations, Amazon.com, accessed on Apr. 24, 2017; 5 pages.

"Toygully 12 Pack Solid Steel Finish Hangers with Clips strong," PAYtm.com, accessed on Apr. 26, 2017; 3 pages.

Search Report in United Kingdom Patent Application No. GB1621567.5, dated Jun. 14, 2017; 5 pages.

Notice of Allowance in U.S. Appl. No. 29/572,901, dated May 17, 2017; 9 pages.

"Actionclub Wall Mount Grocery Bag Dispenser Kitchen Plastic Recycle Storage Box Garbage Bag Orangizer Container Holder," AliExpress.com, accessed on Jun. 14, 2017; 3 pages.

"BG001-0111 : Bag Dispenser—Single," BowmanDispensers.com, accessed on Jun. 14, 2017; 8 pages.

"Axis Chrome Over Cabinet Plastic Bag Holder," OrganizeIt.com, accessed on Jun. 14, 2017; 2 pages.

"Simplehuman Stainless Steel Grocery Bag Holder," ContainerStore.com, accessed on Jun. 14, 2017; 2 pages.

Search Report in UK Patent Application No. GB1621562.6, dated Jun. 14, 2017; 4 pages.

Search Report in UK Patent Application No. GB1621564.2 dated Jun. 15, 2017; 5 pages.

Search Report in UK Patent Application No. GB1702839.0 dated Jun. 14, 2017; 5 pages.

Notice of Allowance in U.S. Appl. No. 15/653,768, dated May 2, 2018; 12 pages.

Notice of Allowance in U.S. Appl. No. 15/703,307, dated May 23, 2018; 5 pages.

Non-Final Office Action in U.S. Appl. No. 15/383,126, dated May 16, 2018; 6 pages.

Notice of Allowance in U.S. Appl. No. 15/641,367, dated Jun. 7, 2018; 5 pages.

Non-Final Office Action in U.S. Appl. No. 15/383,151, dated May 25, 2018; 13 pages.

Non-Final Office Action in U.S. Appl. No. 15/383,170, dated Jul. 3, 2018; 10 pages.

Notice of Allowance in U.S. Appl. No. 16/053,248 dated Oct. 11, 2018; 7 pages.

Notice of Allowance in U.S. Appl. No. 15/383,170 dated Dec. 6, 2018; 5 pages.

Notice of Allowance in U.S. Appl. No. 15/383,151 dated Dec. 21, 2018; 9 pages.

Final Office Action in U.S. Appl. No. 15/383,126, dated Nov. 14, 2018; 6 pages.

Restriction Requirement in U.S. Appl. No. 15/433,365 dated Dec. 31, 2018; 5 pages.

Non-Final Office Action in U.S. Appl. No. 15/433,388 dated Dec. 31, 2018; 6 pages.

Restriction Requirement in U.S. Appl. No. 16/102,954 dated Jul. 3, 2019; 7 pages.

Non-Final Office Action in U.S. Appl. No. 16/238,705 dated Apr. 18, 2019; 7 pages.

Notice of Allowance in U.S. Appl. No. 15/433,365 dated Apr. 18, 2019; 5 pages.

(56) References Cited

OTHER PUBLICATIONS

Notice of Allowance and Fees Due in U.S. Appl. No. 15/433,388, dated May 21, 2019; 5 pages.
Non-Final Office Action in U.S. Appl. No. 15/433,365 dated Feb. 5, 2019; 8 pages.
Restriction Requirement in U.S. Appl. No. 15/676,143 dated Apr. 1, 2019; 6 pages.
Non-Final Office Action in U.S. Appl. No. 15/676,218 dated Feb. 22, 2019; 12 pages.
Notice of Allowance in U.S. Appl. No. 15/383,126 dated Jan. 15, 2019; 5 pages.
Final Office Action in U.S. Appl. No. 15/676,218, dated Jul. 25, 2019; 7 pages.
Notice of Allowance in U.S. Appl. No. 16/238,705 dated Aug. 21, 2019; 5 pages.

* cited by examiner

SHOPPING CART BAGGING STATION

CROSS REFERENCE TO RELATED APPLICATION

This invention claims priority to U.S. provisional patent application Ser. No. 62/628,684, filed Feb. 9, 2018 and entitled "Shopping Cart Bagging Station," the entirety of which is incorporated herein by reference.

BACKGROUND OF THE INVENTION

Technical Field

This invention relates to retail store fixtures, and, more specifically, to a bagging station that couples to a shopping cart.

State of the Art

A bagging station is a fixture located in a retail store that holds a stack of shopping bags, often plastic shopping bags, and dispenses these bags as they are filled with products a customer has purchased. The shopping bags are held in a manner and position such that it is easy and convenient for a person to open one bag at a time, place purchased items in the bag, and then remove the bag and the enclosed products from the bagging station. Bagging stations have traditionally been located at checkout stations where customers pay for their products, because that is where the products have traditionally been transferred from a shopping cart to the shopping bags. With the advent of electronic purchasing and self-checkout, however, customers are now able to pay for and bag their products as they shop, and these actions can occur at locations besides checkout stations. There is a need for bagging stations in locations in retail stores besides at the checkout station. Additionally, there is a need for a bagging station that can withstand extreme temperatures and hold bags with heavy items.

Accordingly, what is needed is a bagging station that can be mounted in a shopping cart, that is durable and compact, and can hold bags with heavy items in them.

DETAILED DESCRIPTION OF EMBODIMENTS OF THE INVENTION

Figure 1:
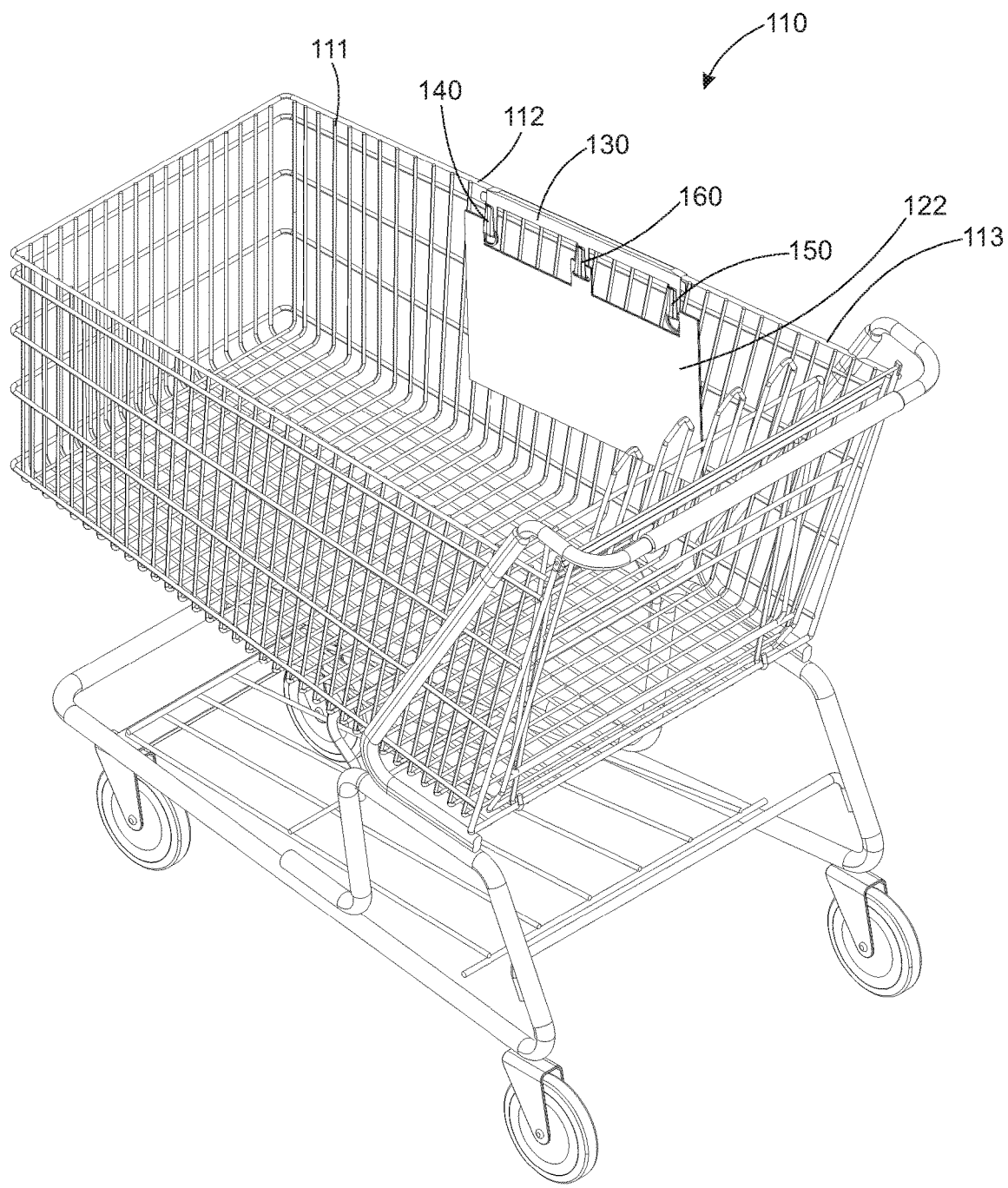
FIG. 1 shows a combination of a shopping cart bagging station and a shopping cart, with the shopping cart bagging station coupled to the shopping cart.

Disclosed herein are embodiments of an invention related to retail store fixtures, more specifically to a bagging station that is used in combination with a shopping cart. A bagging station is a fixture located in a retail store that holds a stack of shopping bags, often plastic shopping bags, and dispenses these bags as they are filled with products a customer has purchased. The shopping bags are held in a manner and position such that it is easy and convenient for a person to open one bag at a time, place purchased items in the bag, and then remove the bag and the enclosed products from the bagging station. Bagging stations have traditionally been located at checkout stations where customers pay for their products, because that is where the products have traditionally been transferred from a shopping cart to the shopping bags. However, with the advent of self-checkout, customers often need a bagging station as they shop to bag their purchases while shopping. The disclosed shopping cart bagging station can be used by customers to bag their purchases as they shop or by employees bagging items for a customer. The disclosed shopping cart bagging station is sturdy and can hold bags that are carrying some weight in them.

In a specific embodiment, the disclosed shopping cart bagging station includes a support channel and three hooks fixedly attached to the support channel. The support channel includes a backbone bar, a first side bar coupled to the backbone bar, and a second side bar coupled to the backbone bar. The three hooks are coupled to the second side bar. The support channel also includes a first and a second protrusion, and a first and a second locking tab, all of which help lock the shopping cart bagging station to a rail of a shopping cart.

The shopping cart bagging station holds a plurality of shopping bags and dispenses the shopping bags one at a time as products are placed in a shopping bag. The first and the second hook each hold a handle of a shopping bag so the shopping bag is held open to be filled. A third hook holds a stack of shopping bags ready to be opened and filled.

The support channel has a cross-sectional shape of channel—a rectangle with one open side. The channel fits over the top rail of a shopping cart to couple the shopping cart bagging station to the shopping cart. The first and second protrusion and the first and second locking tab help lock the support channel to the top rail.

The shopping cart bagging station can be mounted at various locations on a shopping cart, making it easy and convenient for a customer to carry and load a plurality of shopping bags as they shop. The disclosed shopping cart bagging station provides a means for a customer to load purchases into bags as they shop, instead of having to bag their purchases at a checkout station. And, the disclosed shopping cart bagging station provide a way for employees to load and carry a large number of bags with a shopping cart at a pickup station.

FIG. 1 through FIG. 5 shows a shopping cart bagging station 110 coupled to a side 111 of a shopping cart 113. Shopping cart bagging station 110 is used to hold and dispense at least one shopping bag 122. Shopping cart bagging station 110 includes three hooks, a first hook 140, a second hook 150, and a third hook 160. Each one of first hook 140, second hook 150, and third hook 160 are coupled to a support channel 130. Support channel 130 couples to a top rail 112 of shopping cart 113, in this embodiment.

Hooks 140, 150, and 160 are used to hold and dispense shopping bag 122. Shopping bag 122 is hung from its hanger hole on third hook 160, as shown in FIG. 1. First and second hooks 140 and 150 each hold a handle hanger of shopping bag 122. With shopping bag 122 hung from first hook 140, second hook 150, and third hook 160, and support channel 130 coupling shopping cart bagging station 110 to shopping cart 113, shopping cart bagging station 110 is used to hold and dispense shopping bags 122 for a customer using shopping cart 113. When the customer desires to fill shopping bag 122, a front side of shopping bag 122 is pulled away from third hook 160 to leave shopping bag 122 open but still hanging from shopping cart bagging station 110. Items are placed in shopping bag 122 until shopping bag 122 is full. Shopping bag 122 is removed from shopping cart bagging station 110 by pulling it away from first hook 140, second hook 150, and third hook 160. Shopping bag 122, with purchased items in it, is placed in shopping cart 113 or removed from the retail store. If it is desired to fill another shopping bag, the next one shopping bag is opened and filled.

Figure 2:
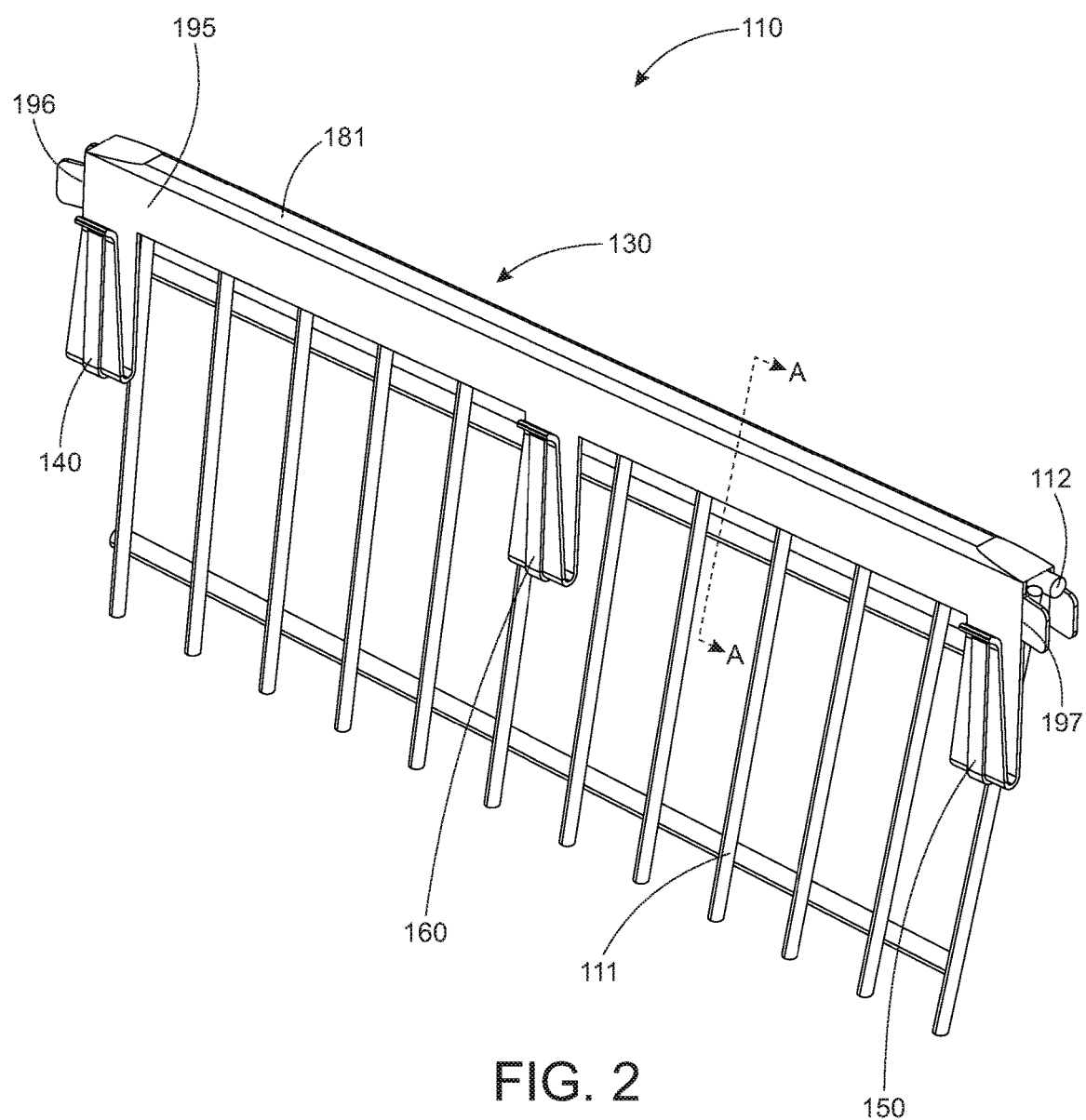
FIG. 2 shows a close-up front perspective view of the shopping cart bagging station of FIG. 1 coupled to a side of the shopping cart.
Figure 3:
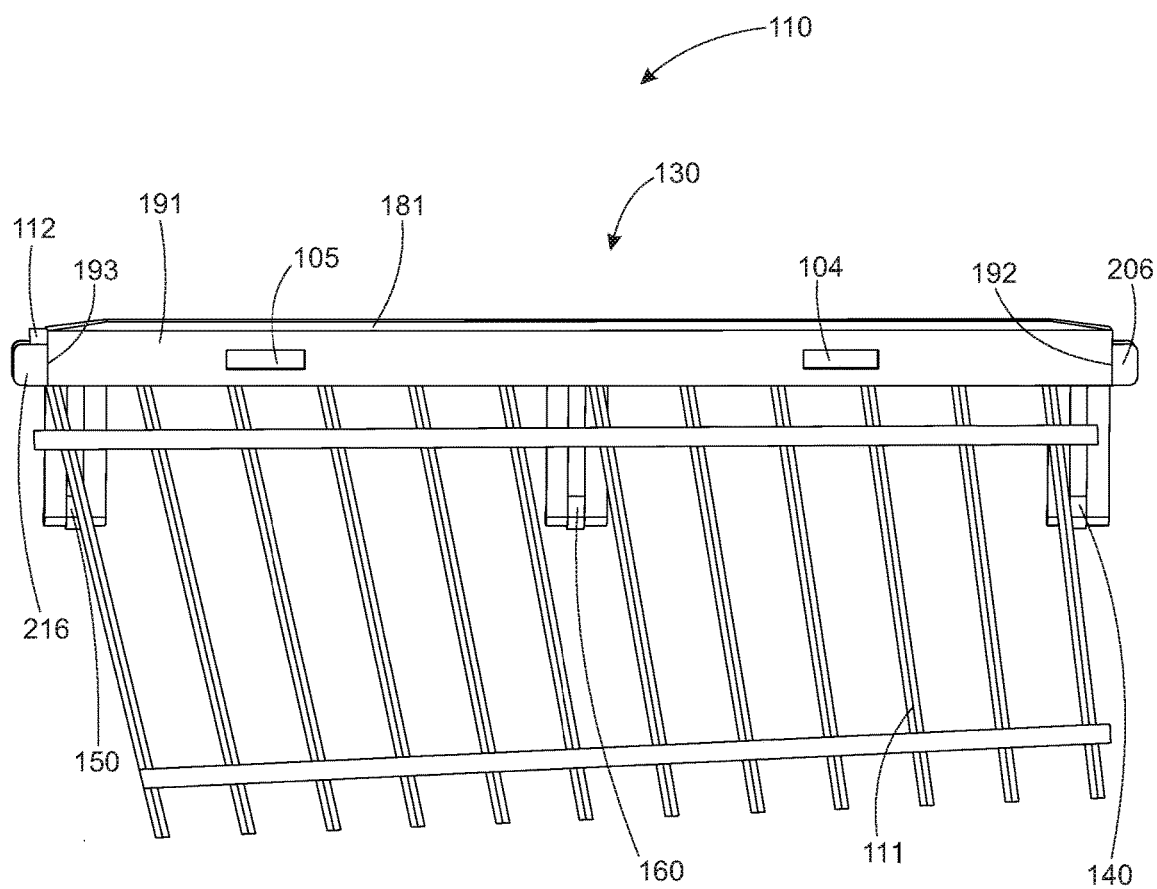
FIG. 3 shows a close-up rear view of the shopping cart bagging station of FIG. 1 coupled to the side of the shopping cart.
Figure 4:
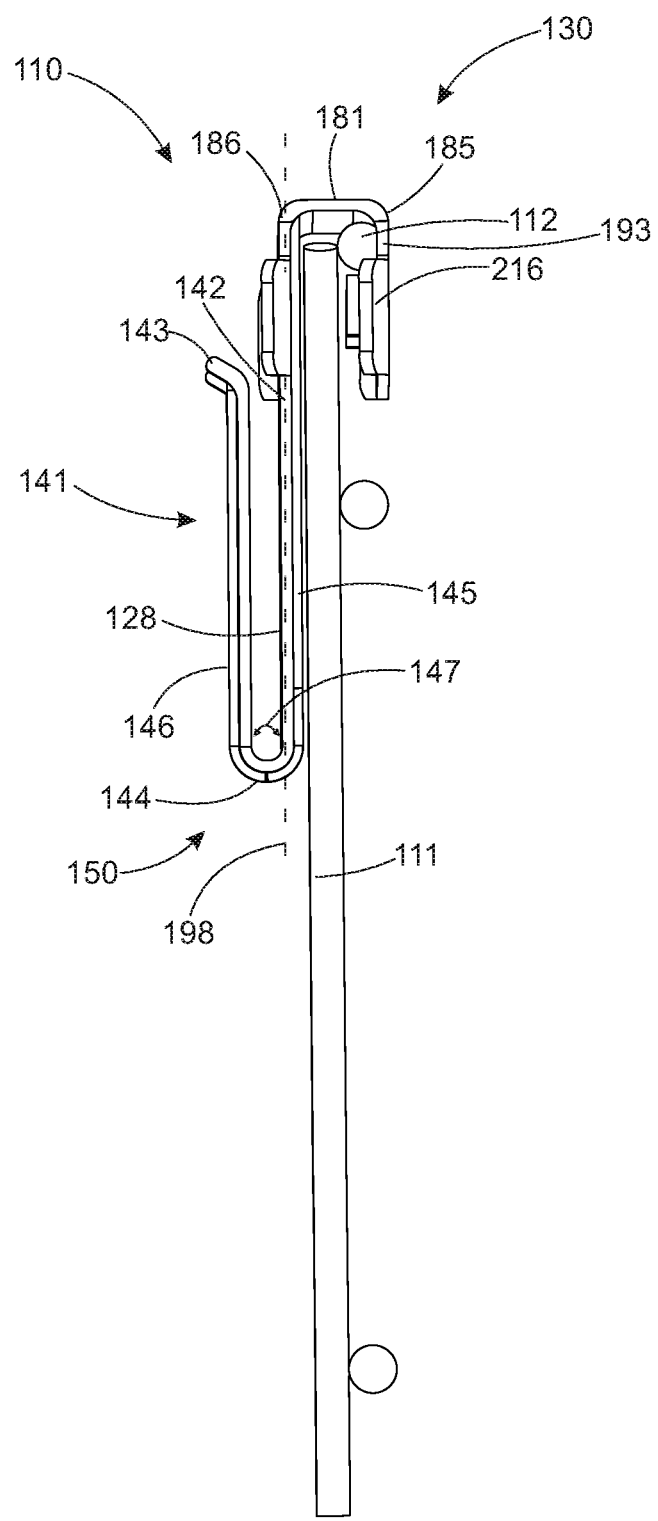
FIG. 4 shows a side view of the shopping cart bagging station of FIG. 1 coupled to the side of the shopping cart.
Figure 5:
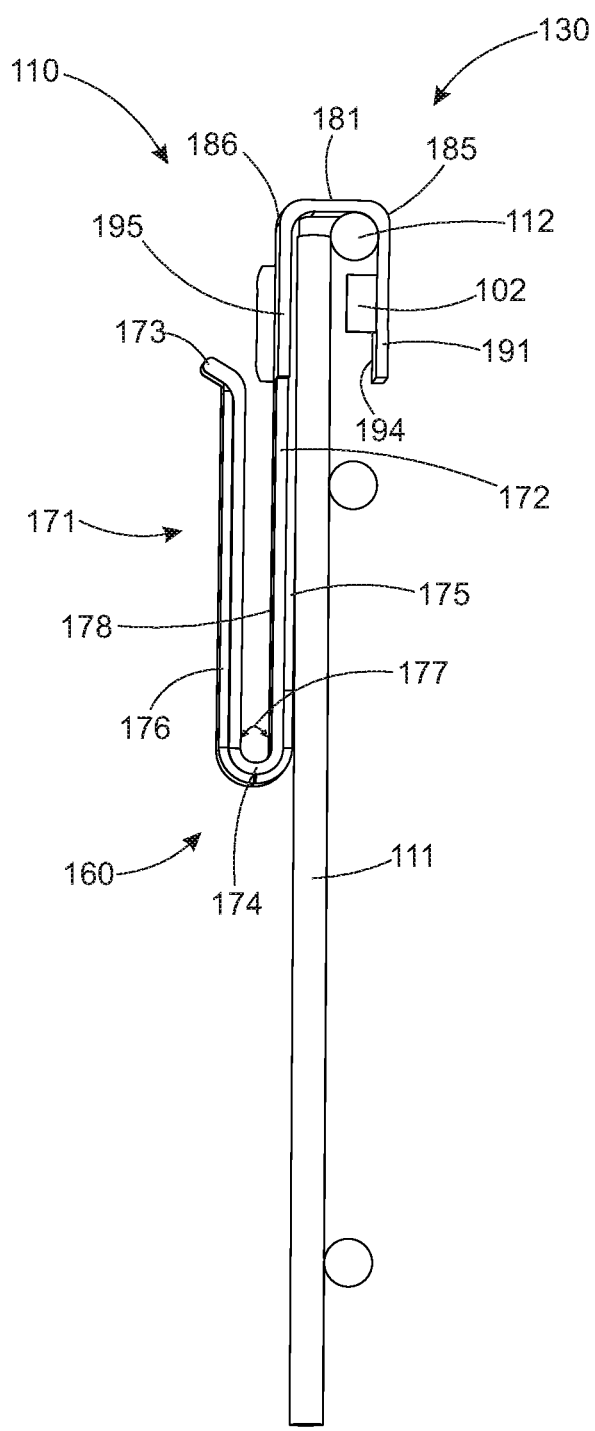
FIG. 5 shows a side cross-sectional view of the shopping cart bagging station of FIG. 1 coupled to the side of the shopping cart.
Figure 6:
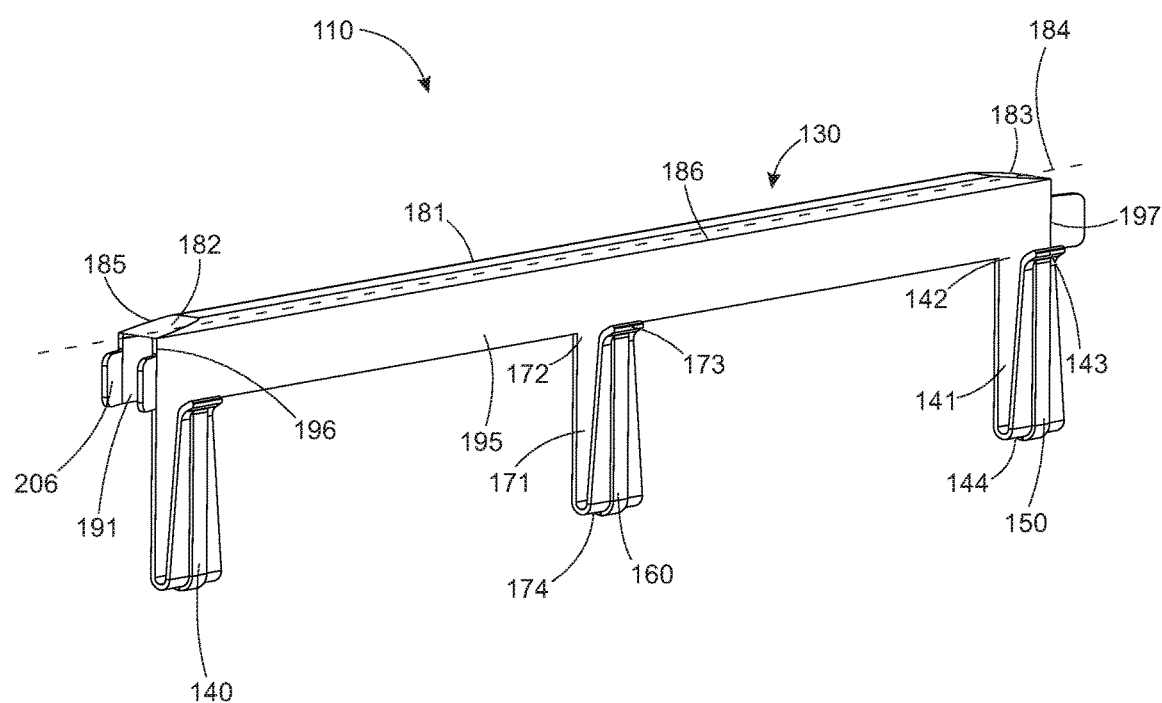
FIG. 6 shows a front perspective view of a shopping cart bagging station.
Figure 7:
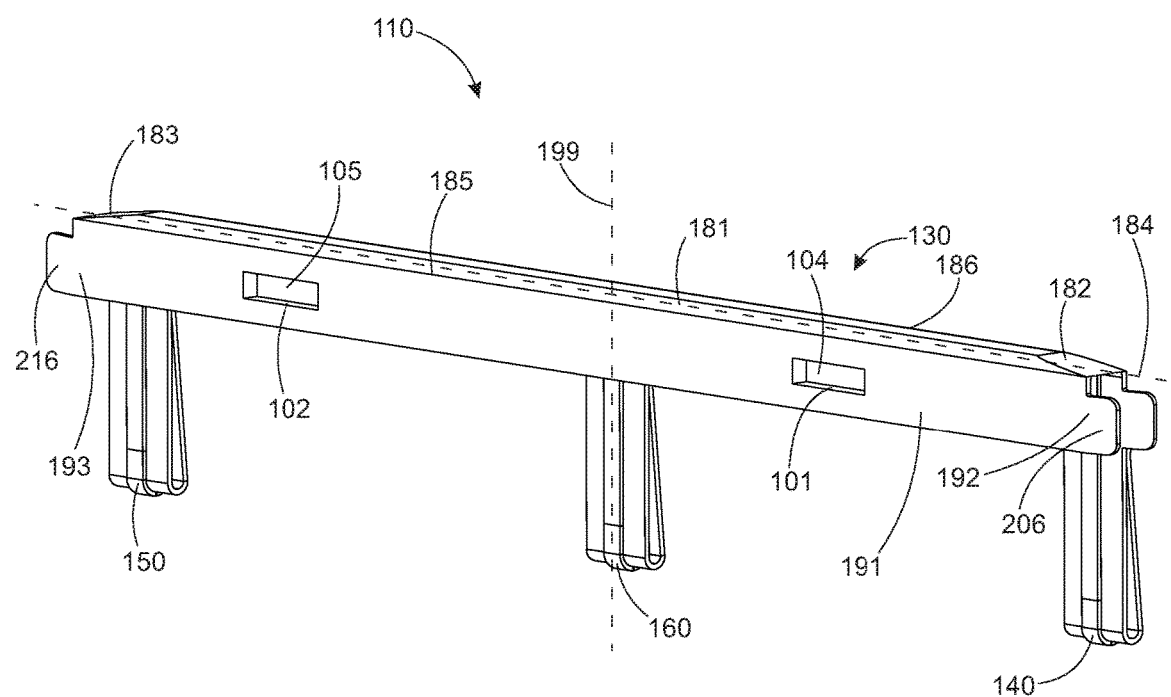
FIG. 7 shows a rear perspective view of the shopping cart bagging station of FIG. 6.
Figure 8:
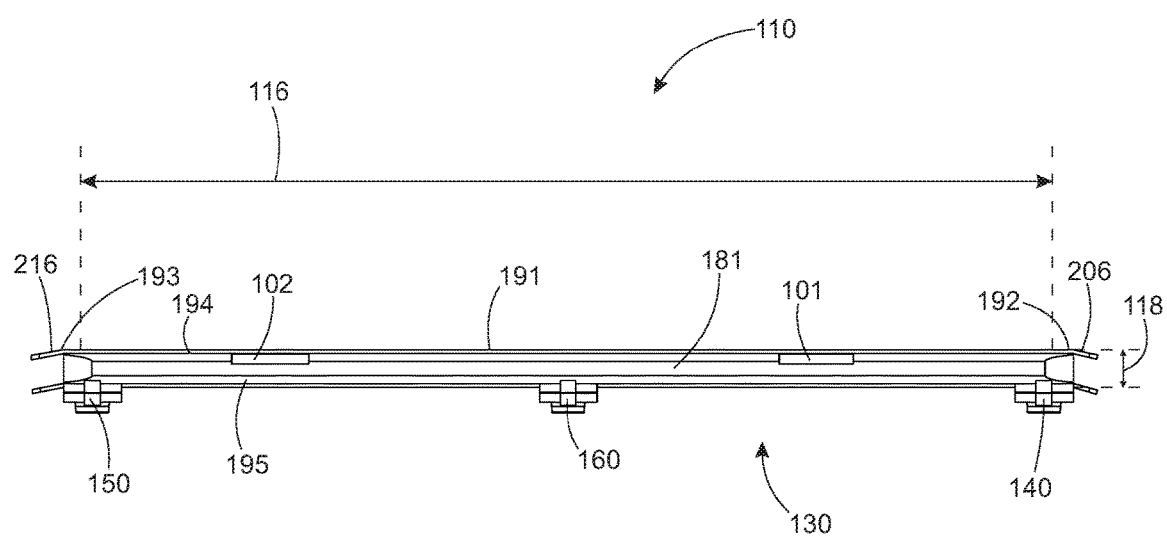
FIG. 8 shows a bottom view of the shopping cart bagging station of FIG. 6.

FIG. 1 through FIG. 5 show a combination of shopping cart bagging station 110 and shopping cart 113, with shopping cart bagging station 110 coupled to shopping cart 113. FIG. 1 shows a perspective view of shopping cart bagging station 110 coupled to top rail 112 of shopping cart 113. FIG. 2 shows a close-up front perspective view of shopping cart bagging station 110 coupled to top rail 112 of side 111 of shopping cart 113. FIG. 3 shows a close-up rear perspective view of shopping cart bagging station 110 coupled to top rail 112 of side 111 of shopping cart 113. FIG. 4 shows a side view of shopping cart bagging station 110 coupled to top rail 112 of side 111 of shopping cart 113. FIG. 5 shows a side cross-section view of shopping cart bagging station 110 coupled to top rail 112 of side 111 of shopping cart 113 taken at A-A of FIG. 2. FIG. 6 through FIG. 8 show additional details of shopping cart bagging station 110. FIG. 6 shows a front perspective view of shopping cart bagging station 110. FIG. 7 shows a rear perspective view of bagging station 110. FIG. 8 shows a bottom view of shopping cart bagging station 110.

Shopping cart bagging station 110 includes support channel 130, first hook 140, second hook 150, and third hook 160. First hook 140, second hook 150, and third hook 160 are fixedly attached (coupled, joined, connected) to support channel 130, as shown in the figures. Shopping cart bagging station 110 is coupled to shopping cart top rail 112 of a side 111 of shopping cart 113 in the embodiment shown in FIG. 1 through FIG. 5. Shopping cart bagging station 110 can be coupled to many different rails of shopping cart 113 and in many different positions in shopping cart 113.

Support channel 130 is the structural frame of shopping cart bagging station 110. Support channel 130 couples to top rail 112. Support channel 130 is a structural channel—it has a cross-section that is generally rectangular-shaped with three sides and one open side, see FIG. 5 and FIG. 8. Support channel 130 is formed of a rigid material and includes a backbone bar 181 that opposes the open side of support channel 130, see FIG. 6 though FIG. 8. Support channel 130 also includes a first side bar 191 and a second side bar 195 on either side of backbone bar 181, see FIG. 5, for example. Support channel 130 slips over top rail 112 so that support channel 130 hangs from top rail 112, as shown in FIG. 1 through FIG. 5.

Support channel 130 has a length 116 and a width 118, as shown in FIG. 8. Support channel 130 has support channel length to width ratio of about 25:1 in this embodiment. In some embodiments, support channel 130 has a support channel length to width ratio of between about 20:1 and about 30:1. A support channel length to width ratio of between about 20:1 to about 30:1 has been shown to give support bar 130 the strength it needs to hold a full shopping bag 122 without breaking, and not be too heavy.

Backbone bar 181 is a flat elongate bar of rigid material. Backbone bar 181 is formed of plastic in this embodiment, but this is not meant to be limiting. Backbone bar 181 can be formed of metal, wood, composites, or any suitable rigid material. Backbone bar 181 has a backbone bar first end 182 and a backbone bar second end 183 opposing backbone bar first end 182, as shown in FIG. 6 and FIG. 7. Backbone bar 181 also has a backbone bar longitudinal axis 184 extending from backbone bar first end 182 to backbone bar second end 183. Backbone bar 181 has a backbone bar first side edge 185 and a backbone bar second side edge 186 opposing backbone bar first side edge 185, as shown in FIG. 4 through FIG. 7.

First side bar 191 is a flat elongate bar of rigid material. First side bar 191 is formed of plastic in this embodiment, but this is not meant to be limiting. First side bar 191 can be formed of metal, wood, composites, or any suitable rigid material. First side bar 191 has a first side bar first end 192 and a first side bar second end 193 opposing first side bar first end 192, as shown in FIG. 7. First side bar 191 is coupled (joined, attached, connected) to and extends from backbone bar first side edge 185, best seen in FIG. 5 and FIG. 7. First side bar 191 is perpendicular to backbone bar 181. First side bar first end 192 is adjacent backbone bar first end 182. First side bar second end 193 is adjacent backbone bar second end 183, see FIG. 7. First side bar 191 has an inner surface 194, as shown in FIG. 5.

Second side bar 195 is a flat elongate bar of rigid material. Second side bar 195 is formed of plastic in this embodiment, but this is not meant to be limiting. Second side bar 195 can be formed of metal, wood, composites, or any suitable rigid material. Second side bar 195 has a second side bar first end 196 and a second side bar second end 197 opposing second side bar first end 196, as shown in FIG. 6. Second side bar 195 is coupled (joined, attached, connected) to and extends from backbone bar second side edge 186, best seen in FIG. 5 and FIG. 6. Second side bar 195 is perpendicular to backbone bar 181. Second side bar first end 196 is adjacent backbone bar first end 182. Second side bar second end 197 is adjacent backbone bar second end 183, see FIG. 6.

Support channel 130 includes a first protrusion 101 and a second protrusion 102, as shown in FIG. 5, FIG. 7, and FIG. 8. First and second protrusion 101 and 102 are rectangular shaped elements that are joined to and protrude from inner surface 194 of first side bar 191. First and second protrusions 101 and 102 protrude from inner surface 194 towards second side bar 195, best seen in FIG. 5 and FIG. 8. First and second protrusions 101 and 102 are used to couple shopping cart bagging station 110 to side 111 of shopping cart 113, as shown in FIG. 5. When shopping cart bagging station 110 is being coupled to shopping cart 113, top rail 112 of shopping cart side 111 is slid into support channel 130. alongside and past first and second protrusion 101 and 102 such that first and second protrusions 101 and 102 capture top rail 112 against backbone bar 181, as shown in FIG. 5. Shopping cart top rail 112 extends between backbone bar 181 and first and second protrusion 101 and 102 once shopping cart bagging station 110 is coupled to top rail 112, keeping support channel 130 and shopping cart bagging station 110 coupled to shopping cart 113.

First and second protrusion 101 and 102 are formed, in this embodiment, by making cutouts in first side bar 191 and folding these cutouts inward onto inner surface 194 of first side bar 191. One cutout forms a first opening 104 in first side bar 191. First opening 104 is the hole formed in first side bar 191 when a cutout is made in first side bar 191 and folded onto inner surface 194 to create first protrusion 101, as shown in FIG. 7. First opening 104 extends through first side bar 191 between first protrusion 101 and backbone bar 181, See FIG. 7. Another cutout forms a second opening 105 in first side bar 191. Second opening 105 is the hole formed in first side bar 191 when a second cutout is made in first side bar 191 and folded onto inner surface 194 to create second protrusion 102, as shown in FIG. 5 and FIG. 7. Second opening 105 extends through first side bar 191 between second protrusion 102 and backbone bar 181.

Support channel 130 also includes a first locking tab 206 and a second locking tab 216, as shown in FIG. 3 through FIG. 8. First and second locking tab 206 and 216 are each rectangular extensions, or tabs, that are coupled (joined, fixedly attached, connected) to and extend from either end of first side bar 191 to help couple shopping cart bagging station 110 to shopping cart 113. First locking tab 206 is coupled to and extends from first side bar first end 192, as shown in FIG. 3, FIG. 7, and FIG. 8. Second locking tab 216 is fixedly attached to and extends from first side bar second end 193, as shown in FIG. 3, FIG. 4, FIG. 7, and FIG. 8. FIG. 4 illustrates how first and second locking tab 206 and 216 help couple shopping cart bagging station 110 to shopping cart 113. First and second locking tabs 206 and 216 extend from first side bar first end 192 and first side bar second end 193 and bend towards second side bar 195, as shown in the figures. As top rail 112 is being slid into support channel 130, top rail 112 slides past first and second locking tabs 206 and 216. First and second locking tabs 206 and 216 capture top rail 112 between backbone bar 181 and first and second locking tabs 206 and 216 once top rail 112 is slid past first and second locking tab 206 and 216, as best seen in FIG. 4. First locking tab 206 extends from first side bar first end 192 and captures top rail 112 between first locking tab 206 and backbone bar 181 once shopping cart bagging station 110 is slid onto side 111 of shopping cart 113. Second locking tab 216 extends from first side bar second end 193 and captures top rail 112 between second locking tab 216 and backbone bar 181 (see FIG. 4) once shopping cart bagging station 110 is slid onto side 111 of shopping cart 113. Support channel 130 of shopping cart bagging station 110 slides over top rail 112, with first and second protrusion 101 and 102 and first and second locking tab 206 and 216 sliding over top rail 112 and locking support channel 130 on top rail 112 once top rail 112 is between backbone bar 181 and first and second protrusion 101 and 102 and first and second locking tab 206 and 216.

Each of three hooks 140, 150, and 160 are fixedly coupled (attached, joined, connected) to second side bar 195 of support channel 130, as shown in the figures. In the embodiment shown in the figures, first hook 140 is coupled to support channel 130 at second side bar first end 196, as shown in FIG. 2 and FIG. 6. Second hook 150 is coupled to support channel 130 at second side bar second end 197, and third hook 160 is coupled to support channel 130 at a second side bar midpoint 199 (FIG. 7) that is about halfway between second side bar first end 196 and second side bar second end 197.

Each of three hooks 140, 150, and 160 have the same features. Details will be provided herein for second hook 150 as shown in FIG. 4 and third hook 160 as shown in FIG. 5. The descriptions for first hook 140 are the same as for second and third hook 150 and 160.

Second hook 150 is formed of a hook bar 141 that is folded to create a hook shape, see FIG. 4 and FIG. 6. Hook bar 141 includes a hook bar first end 142 that is coupled to second side bar second end 197 of second side bar 195 (FIG. 6), and a hook bar second end 143 opposing hook bar first end 142. Second hook 150 is perpendicular to second side bar 195.

Hook bar 141 is folded over on itself at a hook bar lateral bend 144, best seen in FIG. 4 and FIG. 6. Hook bar lateral bend 144 is between hook bar first end 142 and hook bar second end 143. Hook bar 141 folds back on itself at hook bar lateral bend 144, forming a hook bar angle 147 (FIG. 4) that is between about 10 degrees to about 50 degrees. This range of angles for hook bar angle 147 provides a second hook 150 that easily receives a shopping bag handle. In this embodiment, hook bar angle 147 is about 30 degrees.

Hook bar lateral bend 144 divides hook bar 141 into a shank portion 145 and a hook end portion 146, see FIG. 4. Shank portion 145 extends from hook bar first end 142 to hook bar lateral bend 144. Shank portion 145 extends perpendicularly from second side bar 195 and lies in second side bar plane 198 (FIG. 4). Shank portion 145 is straight in this embodiment.

Hook end portion 146 extends from hook bar lateral bend 144 to hook bar second end 143 (FIG. 4). Hook bar 141 folds back over itself at bottom hook bar lateral bend 144, with hook bar angle 147 formed between shank portion 145 and hook end portion 146. Hook end portion 146 has a width that is not constant over the length of hook end portion 146, in this embodiment. Hook end portion 146 has a width that tapers along the length of hook end portion 146. In this embodiment, hook end portion 146 has a width that is smaller at hook bar second end 143 than at hook bar lateral bend 144. Hook end portion 146 is longer than shank portion 145 in this embodiment. Hook bar lateral bend 144 is not halfway between hook bar first end 142 and hook bar second end 143. In this embodiment, hook end portion 146 has a length that is larger than the length of shank portion 145.

Hook end portion 146 folds over a shank portion front surface 128 (FIG. 4). Hook end portion 146 has a somewhat S-shaped cross section as shown in FIG. 4, wherein hook bar second end 143 bends outward away from shank portion 145. The S-shaped cross section of bottom hook end portion 146 provides the out-turned hook bar end 143 that makes it easy to slide shopping bag handles onto second hook 150.

Third hook 160 is formed of a hook bar 171 that is folded to create a hook shape, see FIG. 5 and FIG. 6. Hook bar 171 includes a hook bar first end 172 that is coupled to second side bar 195 at second side bar midpoint 199 (FIG. 6 and FIG. 7), and a hook bar second end 173 opposing hook bar first end 172. Third hook 160 is perpendicular to second side bar 195.

Hook bar 171 is folded over on itself at a hook bar lateral bend 174, best seen in FIG. 5 and FIG. 6. Hook bar lateral bend 174 is between hook bar first end 172 and hook bar second end 173. Hook bar 171 folds back on itself at hook bar lateral bend 174, forming a hook bar angle 177 (FIG. 5) that is between about 10 degrees to about 50 degrees. This range of angles for hook bar angle 177 provides a third hook 160 that easily accepts a stack of shopping bags by sliding the shopping bag center hole onto third hook 160. In this embodiment, hook bar angle 177 is about 30 degrees.

Hook bar lateral bend 174 divides hook bar 171 into a shank portion 175 and a hook end portion 176, see FIG. 5. Shank portion 175 extends from hook bar first end 172 to hook bar lateral bend 174. Shank portion 175 extends perpendicularly from second side bar 195 and lies in second side bar plane 198 (FIG. 4). Shank portion 175 is straight in this embodiment.

Hook end portion 176 extends from hook bar lateral bend 174 to hook bar second end 173 (FIG. 5). Hook bar 171 folds back over itself at bottom hook bar lateral bend 174, with hook bar angle 177 formed between shank portion 175 and hook end portion 176. Hook end portion 176 has a width that is not constant over the length of hook end portion 176, in the embodiment shown in the figures. Hook end portion 176 has a width that tapers along the length of hook end portion 176. In this embodiment, hook end portion 176 has a width that is smaller at hook bar second end 173 than at hook bar lateral bend 174. Hook end portion 176 is longer than shank portion 175 in this embodiment. Hook bar lateral bend 174 is not halfway between hook bar first end 172 and hook bar second end 173. In this embodiment, hook end portion 176 has a length that is larger than the length of shank portion 175.

Hook end portion 176 folds over a shank portion front surface 178 (FIG. 5). Hook end portion 176 has a somewhat S-shaped cross section as shown in FIG. 5, wherein hook bar second end 173 bends outward away from shank portion 175. The S-shaped cross section of bottom hook end portion 176 provides the out-turned hook bar second end 173 that makes it easy to slide a stack of shopping bags onto third hook 160.

First hook 140 is constructed the same as second hook 150 and third hook 160 and has a corresponding description as the description provided for second hook 150 and third hook 160.

First, second, and third hooks 140, 150, and 160 are used to hold and dispense at least one shopping bag 122. First and second hooks 140 and 150 each hold handles of shopping bags 122. Third hook 160 is used to hang shopping bags 122 from, as shown in FIG. 1.

With support channel 130 coupling shopping cart bagging station 110 to shopping cart 113, and first, second, and third hooks 140, 150, and 160 holding at least one shopping bag 122 as shown in FIG. 1, shopping cart bagging station 110 is ready to be used to hold and dispense shopping bags 122 as a customer uses shopping cart 113 to shop. At least one shopping bag 122 is hung from third hook 160 using the center hanger hole in shopping bag 122. The handles are hung from first hook 140 and second hook 150, as shown in FIG. 1. To fill shopping bag 122, shopping bag 122 is pulled open and items placed in the bag. Once shopping bag 122 is full, it is removed from shopping cart bagging station 110 and placed in shopping cart 113 or removed from the retail store. If more items need to be bagged, another shopping bag is opened and filled using shopping cart bagging station 110.

Shopping cart bagging station 110 can be hung from many different locations on shopping cart 113. Shopping cart bagging station 110 is shown in FIG. 1 hanging from a side 111 of shopping cart 113, but this is not meant to be limiting. Shopping cart bagging station 110 can be hung from the sides, ends, inside, or outside of shopping cart 113.

Shopping cart bagging stations have been shown and described that couple to a shopping cart and are used to hold and dispense shopping bags while a customer is using the shopping cart to shop. The shopping cart bagging station is coupled to a shopping cart so the customer can bag their purchased items as they shop. Shopping bags are hung from the shopping cart bagging station. The shopping cart bagging station provides a convenient way for customers to bag their purchases as they shop, so they do not have to visit a checkout station to have their purchased items bagged.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A shopping cart bagging station comprising:
    a support channel comprising:
        a backbone bar having a backbone bar first end, a backbone bar second end opposing the backbone bar first end, a backbone bar longitudinal axis extending from the backbone bar first end to the backbone bar second end, a backbone bar first side edge and a backbone bar second side edge;
        a first side bar coupled to and extending from the backbone bar first side edge, wherein the first side bar has a first side bar first end adjacent the backbone bar first end, and a first side bar second end adjacent the backbone bar second end, wherein the first side bar is perpendicular to the backbone bar and wherein the first side bar comprises an inner surface;
        a second side bar coupled to and extending from the backbone bar second side edge, wherein the second side bar is perpendicular to the backbone bar;
        a first and a second protrusion, wherein the first and the second protrusion protrude from the inner surface towards the second side bar;
        a first locking tab coupled to and extending from the first side bar first end; and
        a second locking tab coupled to and extending from the first side bar second end;
    and
    a first hook, a second hook, and a third hook, each of the three hooks fixedly attached to the second side bar.

2. The shopping cart bagging station of claim 1, wherein each of the three hooks comprises:
    a hook bar comprising:
        a hook bar first end coupled to the second side bar;
        a hook bar second end opposing the hook bar first end;
        a hook bar lateral bend between the hook bar first end and the hook bar second end;
        a shank portion that extends from the hook bar first end to the hook bar lateral bend, wherein the shank portion extends perpendicularly from the second side bar, and wherein the shank portion lies in a second side bar plane;
    and
    a hook end portion that extends from the hook bar lateral bend to the hook bar second end;
    wherein the hook bar folds back on itself at the hook bar lateral bend forming a hook bar angle between the shank portion and the hook end portion of from about 10 degrees to about 50 degrees.

3. The shopping cart bagging station of claim 1, wherein the first hook is coupled to a second side bar first end, the second hook is coupled to a second side bar second end, and the third hook is coupled to a second side bar midpoint.

4. The shopping cart bagging station of claim 3, wherein the hook end portion folds over a shank portion front surface.

5. The shopping cart bagging station of claim 4, wherein the hook end portion comprises an S-shaped side view cross section.

6. The shopping cart bagging station of claim 5, wherein the shank portion is straight.

7. The shopping cart bagging station of claim 6, wherein the hook end portion is longer than the shank portion.

8. The shopping cart bagging station of claim 1, wherein a first opening extends through the first side bar between the first protrusion and the backbone bar.

9. The shopping cart bagging station of claim 8, wherein a second opening extends through the first side bar between the second protrusion and the backbone bar.

10. The shopping cart bagging station of claim 1, wherein a length to width ratio of the support channel is from about 20:1 to about 30:1.

11. A combination shopping cart and shopping cart bagging station, the combination comprising:
 a shopping cart having a shopping cart side and a shopping cart top rail; and
 a shopping cart bagging station coupled to the shopping cart, wherein the shopping cart bagging station comprises:
  a support channel, wherein the support channel couples to the shopping cart top rail, and
  wherein the support channel comprises:
   a backbone bar having a backbone bar first end, a backbone bar second end opposing the backbone bar first end, a backbone bar longitudinal axis extending from the backbone bar first end to the backbone bar second end, a backbone bar
    first side end and a backbone bar second side end;
   a first side bar coupled to and extending from the backbone bar first side edge,
    wherein the first side bar has a first side bar first end adjacent the backbone bar first end, and a first side bar second end adjacent the backbone bar second end,
    wherein the first side bar is perpendicular to the backbone bar and wherein the first side bar comprises an inner surface;
   a second side bar coupled to and extending from the backbone bar second side edge, wherein the second side bar is perpendicular to the backbone bar;
   a first and a second protrusion, wherein the first and the second protrusion protrude from the inner surface towards the second side bar; and wherein the shopping cart top rail extends between the backbone bar and the first and the second protrusion when the shopping cart bagging station is coupled to the shopping cart;
   a first hook, a second hook, and a third hook, each of the first, second and third hooks fixedly attached to the second side bar;
   a first locking tab coddled to and extending from the first side bar first end, wherein the shopping cart top rail extends between the first locking tab and the backbone bar when the shopping cart bagging station is coupled to the shopping cart; and
   a second locking tab coupled to and extending from the first side bar second end, wherein the shopping cart top rail extends between the second locking tab and the backbone bar when the shopping cart bagging station is coupled to the shopping cart.

12. The combination of claim 11, wherein each of the first, second, and third hooks comprises:
 a hook bar comprising:
  a hook bar first end coupled to the second side bar;
  a hook bar second end opposing the hook bar first end;
  a hook bar lateral bend between the hook bar first end and the hook bar second end;
  a shank portion that extends from the hook bar first end to the hook bar lateral bend,
   wherein the shank portion extends perpendicularly from the second side bar, and
   wherein the shank portion lies in a second side bar plane;
  and
  a hook end portion that extends from the hook bar lateral bend to the hook bar second end;
  wherein the hook bar folds back on itself at the hook bar lateral bend forming a hook bar angle between the shank portion and the hook end portion of from about 30 degrees.

13. The combination of claim 12, wherein the first hook is coupled to a second side bar first end, the second hook is coupled to a second side bar second end, and the third hook is coupled to a second side bar midpoint.

14. The combination of claim 13, wherein the hook end portion folds over a shank portion front surface.

15. The combination of claim 14, wherein the hook end portion comprises an S-shaped side view cross section.

16. The combination of claim 15, wherein each shank portion is straight.

17. The combination of claim 11, wherein a first open ng extends through the first side bar between the first protrusion and the backbone bar.

18. The combination of claim 11, wherein a length to width ratio of the support channel is from about 20:1 to about 30:1.

19. The combination of claim 18, wherein the length to width ratio of the support channel is about 25:1.

* * * * *